July 29, 1952 G. N. SMITH 2,604,814
LIGHTING ATTACHMENT FOR STEREOSCOPIC VIEWERS
Filed Feb. 14, 1950 2 SHEETS—SHEET 1
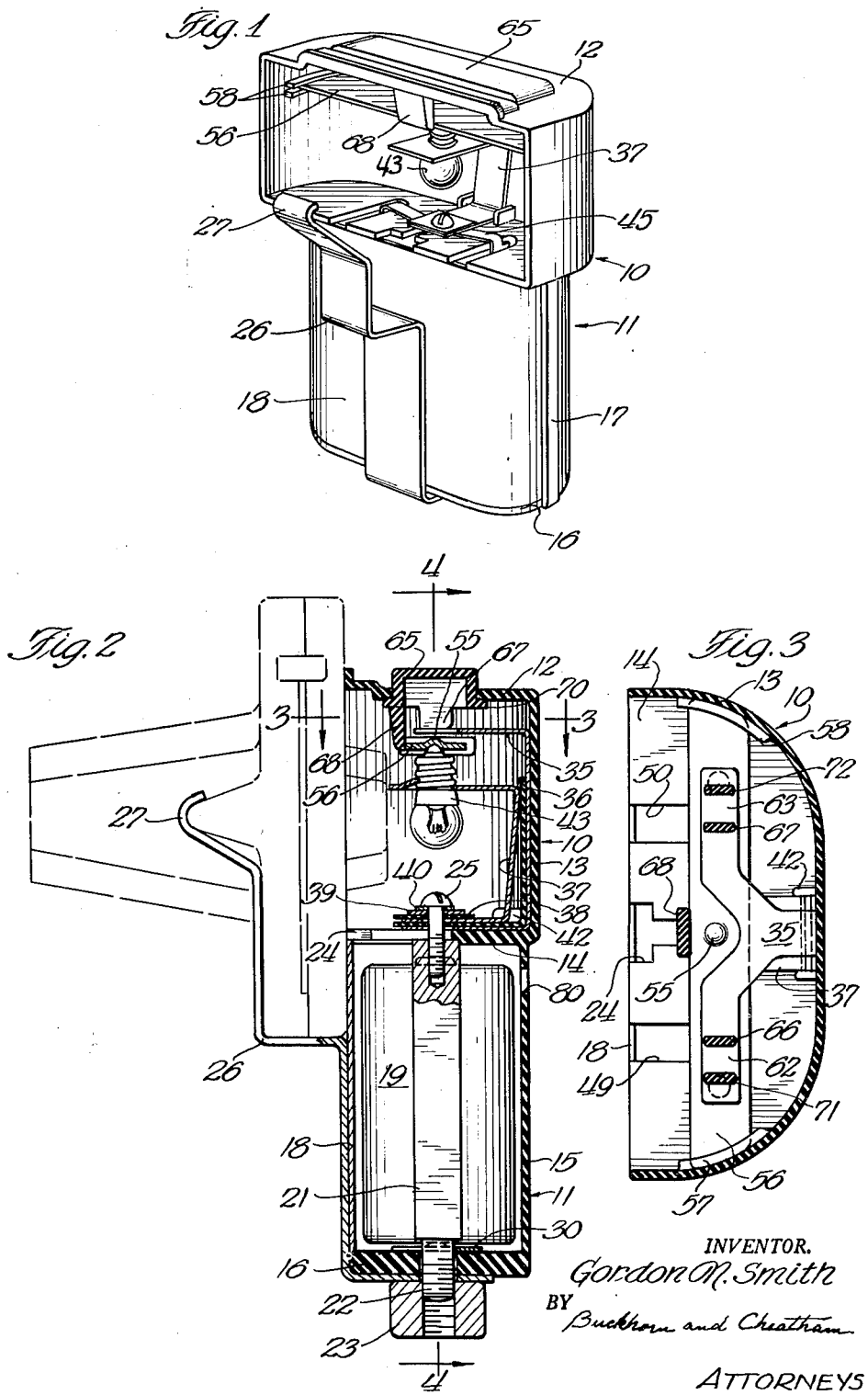
INVENTOR.
Gordon N. Smith
BY Buckhorn and Cheatham
ATTORNEYS

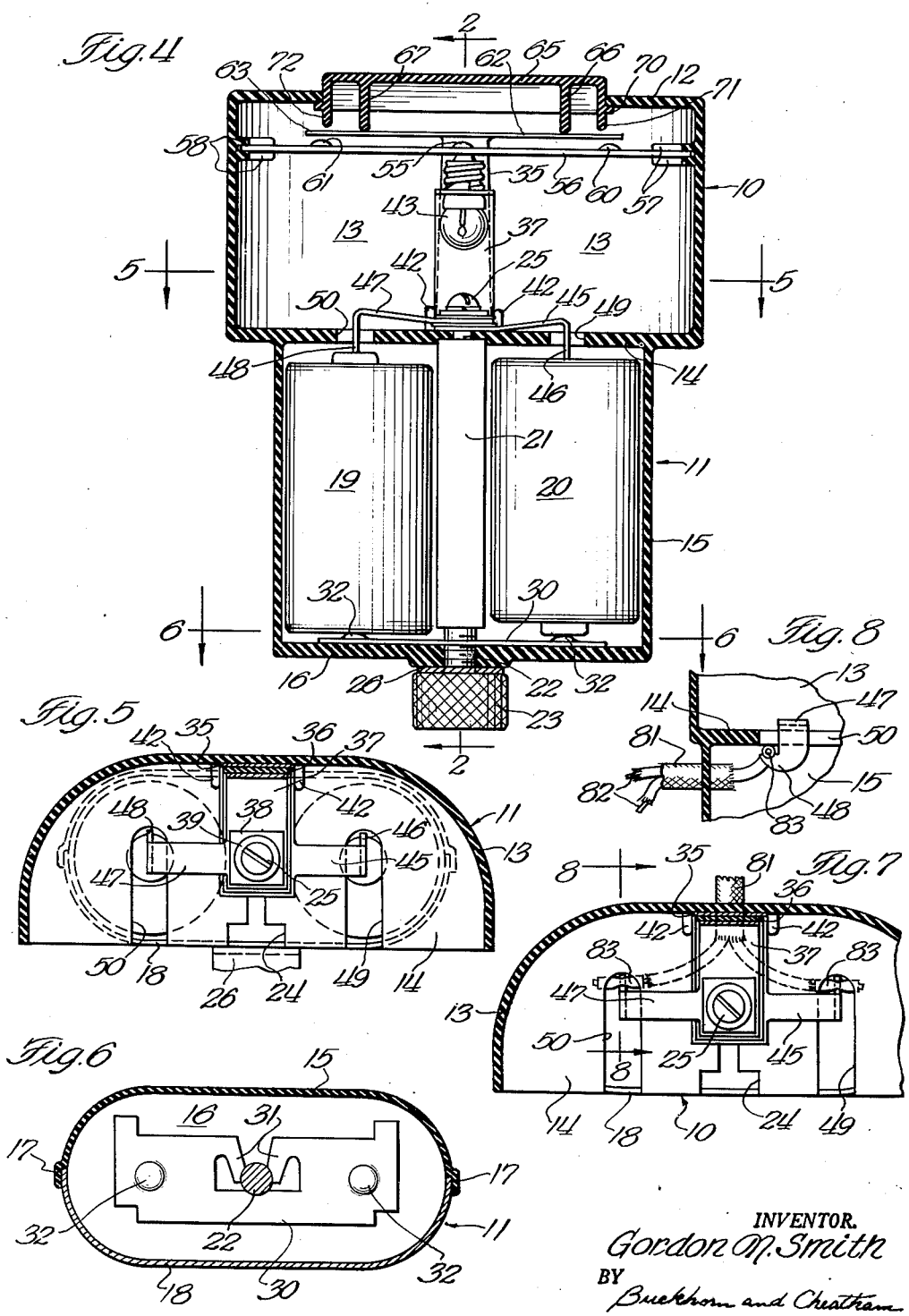

Patented July 29, 1952

2,604,814

UNITED STATES PATENT OFFICE 2,604,814

LIGHTING ATTACHMENT FOR STEREOSCOPIC VIEWERS

Gordon N. Smith, Portland, Oreg., assignor to Sawyer's Inc., Progress, Oreg., a corporation of Oregon Application February 14, 1950, Serial No. 144,055

3 Claims. (Cl. 88—29)

The present invention comprises a viewing attachment for association with a stereoscopic viewer of the type disclosed in the patent to Gruber, No. 2,189,285, issued February 6, 1940, with particular features thereof adapted to an improved model of said viewing device such as disclosed in the copending application of Gruber, Serial No. 744,349, filed April 28, 1947, now Patent No. 2,511,334, issued June 13, 1950. The patent and application disclose a device comprising a housing having a slot therein into which may be inserted a disc carrying a plurality of stereoscopic pairs of transparencies spaced apart by the average human interpupillary distance. The housing is provided with means whereby the disc may be rotated step by step to position each pair of transparencies in line with viewing tunnels through which the transparencies may be viewed when the viewer is directed toward a source of light. It is often inconvenient and annoying to be required to direct the viewer toward a light source, and one purpose of the present invention is to overcome this inconvenience and annoyance by providing a lighting attachment which may be mounted directly upon the viewer itself.

A further object of the present invention is to provide a lighting attachment of the foregoing character which is conveniently arranged to provide a support for the viewer, which may be held in the hand or may be mounted upon a tripod or similar device.

A further object of the present invention is to provide a viewer of the foregoing character including a self-contained source of light which may be energized by batteries contained within the lighting attachment or by connecting the lighting attachment to the house current or the like by means of a detachable plug-in cord, in either case the light being controllable by a switch so arranged as to be easily manipulated regardless of how the viewer is maintained adjacent the eyes of the observer.

A further object of the present invention is to provide a lighting attachment for stereoscopic viewers including a light source which may be maintained at the optimum "color temperature" for optimum "color fidelity" of the transparencies, the foregoing being particularly true when energizing the source of light through a plug-in connector and transformer, but being inherent in the device when a fairly new set of batteries is employed. It is to be appreciated that when transparencies are viewed against a source of light such as an open window or a room lighting fixture the illuminating effect may vary widely, thus causing the views to appear faded or over-illuminated and in some instances causing various shades and tones of colors to be obscured, all of which is eliminated by the use of the present device.

A further object of the present invention is to provide a viewing attachment of the foregoing character which is made of relatively few, easily fabricated and assembled parts and which may be easily assembled with, or detached from, the stereoscopic viewer.

Other objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawing, Fig. 1 is an isometric view of a lighting attachment made in accordance with the present invention;

Fig. 2 is a vertical, central section through the lighting attachment taken substantially along line 2—2 of Fig. 4;

Fig. 3 is a horizontal section taken from the plane of line 3—3 of Fig. 2;

Fig. 4 is a vertical section taken from the plane of line 4—4 of Fig. 2;

Fig. 5 is a horizontal section taken from the plane of line 5—5 of Fig. 4;

Fig. 6 is a horizontal section taken from the plane of line 6—6 of Fig. 4;

Fig. 7 is a view substantially corresponding to Fig. 5, illustrating the association of the device with a conductor cord; and Fig. 8 is a vertical section taken substantially along line 8—8 of Fig. 7.

The invention comprises a housing including an upper part 10 and a lower part 11. The upper part comprises a top wall 12, which is joined on three sides by a forwardly curved, rear wall 13, and a lower partition 14. The bottom compartment includes the partition 14, a forwardly curved, vertical wall 15 and a bottom wall 16. The vertical wall 15 comprises the rear half of an elliptical battery container, the forward edges thereof being outwardly flanged at 17 to receive the rear edges of the front half 18. A pair of dry cells 19 and 20 are mounted in reversed relation to each other in the lower compartment 11, and may be replaced by removing the forward end 18. The dry cells are separated by a central post 21 having a threaded lower end 22 which projects through an opening in the bottom wall 16 and is adapted to be engaged by a mounting nut 23 threadedly engaging the protruding end thereof. The upper end of post 21 is held in place in a suitable, forwardly extending groove embracing a slot 24 in the partition 14, by a screw 25 projecting into the upper compartment. The slot 24 extends to the front edge of the partition 14 and is so shaped and arranged that the threaded end of the post may be inserted through the bottom wall while the post is at a slight inclination and then the post may be moved rearwardly to a vertical relationship, after the post has been assembled with switching apparatus to be described. The front cover 18 is held in position by a clamping arm 26 embracing the bottom wall 16 and the rear cover and having an opening through which the threaded portion of the post extends. The arm 26 is so shaped as to embrace the lower portion of the stereoscopic viewer between a portion thereof and the upper portion of the front cover 18, and is provided with a hook portion 27 at its upper end adapted to embrace a stiffening flange between the rear tunnels of the viewing device. The rear, vertical edges of the vertical wall 13 of the upper compartment are so shaped as to abut the front of the stereoscopic viewer when the lighting attachment is clamped in place by the clamping arm 26 so that the combination provides a dark chamber surrounding the front ends of the viewing tunnels.

The dry cells 19 and 20 rest upon a plate 30 seated upon the bottom wall 16 and provided with a spaced pair of tongues 31 adapted to grip the threaded stem to maintain the plate in position. The outer ends of plate 30 are upwardly embossed as indicated at 32 in order to provide firm contact with the ends of the dry cells and connect them in series as clearly shown in Fig. 4. The screw 25 passes successively through an opening in the lower portion of a first conductor 35, a lower fiber insulator 36, a second conductor 37, an upper fiber insulator 38, a clamping member 39, and a washer 40. When the post 21 is being moved into position the screw 25 must be relatively loose, but when the post has reached its upright position the screw may be tightened to clamp the various members onto the upper surface of the partition 14. The members 35, 36 and 37 extend rearwardly and are received between a pair of lugs 42 protruding forwardly from the rear wall 13 so that the members are held in proper position by the screw and lugs. The member 37 is maintained out of electrical contact with member 35 by the fiber insulator 36, and its upper end projects forwardly and is provided with a formed aperture into which may be screwed the threaded base of a flashlight bulb 43, the filament thereof being thus located midway between the two light tunnels so as to illuminate the opposite curved sections of the rear wall 13 to an equal extent. The inner surface of the reflecting wall is preferably painted a dull white in order that diffused light from a reflective background may be provided in front of the transparencies, the intensity of light through each transparency being the same.

The member 35 is provided with a laterally extending spring terminal 45 provided with a downwardly directed hooked tip 46 adapted to make contact with battery 20, and the member 37 is provided with an oppositely directed spring terminal 47 provided with a downwardly directed hooked tip 48 adapted to make contact with the cell 19. The downwardly directed portions of the terminals pass through forwardly opening slots 49 and 50 in the partition 14 which facilitate assembly. The base of the bulb 43 extends upwardly into a dimple 55 in the center of a transverse bar 56 maintained in position by being wedged between a pair of horizontal ridges 57 at one side of the rear wall and an opposite pair of ridges 58 at the other side of wall 13. At laterally spaced points from the dimple 55 the bar 36 is provided with a pair of dimples 60 and 61. The member 35 is provided with laterally extending, oppositely directed spring contact arms 62 and 63 which terminate above the dimples 60 and 61 respectively. It will be obvious from inspection of the foregoing that if either arm 62 or 63 contacts its associated dimple, or if both should make contact, the bulb 43 would be energized.

The arms 62 and 63 may be depressed by pressing downwardly upon a nonconductive switch bar 65 mounted in an opening through the top wall 12, the switch bar being maintained in position by a pair of downwardly depending lugs 66 and 67 engaging the arms 62 and 63 respectively at points inwardly spaced from the dimples 60 and 61, and by a downwardly depending lug 68 slidably engaging the front edge of the bar 56. The arms 62 and 63 have sufficient strength to maintain a peripheral flange 70 on the switch bar against the lower surface of the top wall 12 until the finger of the observer is used to depress some portion of the switch bar. It will be appreciated from the foregoing that either end of the switch bar, or the entire switch bar, may be depressed to energize the bulb so that it makes little difference how the viewer is held as long as some one of the observer's fingers may reach a portion of the switch bar. At the outer end of the switch bar there is a second pair of depending lugs 71 and 72 which limit downward movement of the switch bar since they are substantially above the dimples 60 and 61.

It is to be observed that the hook tips 46 and 48 provide a pair of terminals located in the lower compartment for connecting the bulb to a source of current comprising the batteries 19 and 20. However, since the batteries are of some weight, it may be desirable to connect the terminals to a source of current externally of the combination, for which purpose the wall 15 is provided with a centrally located opening 80 near its top through which a conductor cable 81 may be introduced into the lower compartment. The separate conductors 82 in the cable 81 are preferably associated with terminal ferrules 83 having central grooves therein engageable beneath the hook tips 46, 48 whereby the spring arms 45 and 47 may clamp the ferrules against the partition 14 as seen in Figs. 7 and 8. The cable 81 may be connected to any suitable source of current such as remotely located batteries, or a transformer associated with the household circuit. It will be readily appreciated that by using a plug-in connector and transformer the "color temperature" of the source of illumination will be maintained at a desired condition so as to create optimum "color fidelity."

The lower compartment 11 projects below the viewer to provide a hand-fitting handle which is somewhat more convenient to hold than the relatively small viewer itself. However, in order to relieve the operator of the necessity of holding the viewer, the combination may be mounted upon any convenient support such as a tripod or other fixed or movable supporting means (not shown) by means of the nut 23. As is seen in Fig. 2, the nut 23 is of considerable thickness and the reduced stem 22 engages only the upper portion thereof so that a threaded stem mounted upon the desired support may be engaged with the lower portion of the nut 23.

Having illustrated and described a preferred embodiment of my invention, it should be apparent to those skilled in the art that the invention permits of modification in arrangement and detail. I claim as my invention all such modifications as come within the true spirit and scope of the appended claims.

I claim:

1. A lighting attachment for association with a stereoscopic viewer of the type including means for holding a pair of transparencies and a pair of viewing tunnels through which the transparencies held therein may be viewed, the said viewing tunnels being spaced apart the average interpupillary distance and the viewer being designed to be held to the eyes and directed toward a source of light; comprising a housing including an upper compartment and a lower compartment, said upper compartment having an open side, the edges of which are shaped to conform to the front surface of the stereoscopic viewer around the front ends of said viewing tunnels whereby said upper compartment when mounted on said viewer forms therewith a dark chamber extending across the front of the viewer, said lower compartment extending below the viewer to provide a handle therefor, a bulb mounted centrally of said upper compartment for illuminating the interior thereof when energized, the interior of the vertical surfaces of said upper compartment comprising reflecting surfaces equidistantly arranged from said bulb and the forward ends of said viewing tunnels whereby said transparencies are equally illuminated when the bulb is energized, and means for connecting said bulb to a source of current including a pair of terminals extending into said lower compartment, a first conductor extending from one of said terminals and supporting said bulb, a second conductor extending from the other of said terminals and including a spring contact arm normally maintained in open circuit relation to said bulb, and a manually engageable, nonconductive switch member engaging said spring switch arm and projecting through the wall of said upper compartment.

2. A lighting attachment for association with a stereoscopic viewer of the type including means for holding a pair of transparencies and a pair of viewing tunnels through which the transparencies held therein may be viewed, the said viewing tunnels being spaced apart the average interpupillary distance and the viewer being designed to be held to the eyes and directed toward a source of light; comprising a housing including an upper compartment and a lower compartment, said upper compartment having an open side, the edges of which are shaped to conform to the front surface of the stereoscopic viewer around the front ends of said viewing tunnels whereby said upper compartment when mounted on said viewer forms therewith a dark chamber extending across the front of the viewer, said lower compartment extending below the viewer to provide a handle therefor, a bulb mounted centrally of said upper compartment for illuminating the interior thereof when energized, the interior of the vertical surfaces of said upper compartment comprising reflecting surfaces equidistantly arranged from said bulb and the forward ends of said viewing tunnels whereby said transparencies are equally illuminated when the bulb is energized, and means for connecting said bulb to a source of current including a pair of terminals extending into said lower compartment, a first conductor connected to one of said terminals and supporting said bulb, a second conductor connected to the other of said terminals and including a pair of resilient switch arms overlying said bulb in spaced relationship thereto, insulating means separating said conductors, a conductor bar bridging the interior of said upper compartment in contacting relationship with the base of said bulb, and a nonconductive switch bar resting upon said spring switch arms and projecting through an opening in the upper wall of said upper compartment, said nonconducting switch bar and said spring switch arms being so arranged that depression of any portion of said switch bar causes contact of a portion of at least one of said switch arms with a portion of said bar to energize said bulb.

3. A lighting attachment for association with a stereoscopic viewer of the type including means for holding a pair of transparencies and a pair of viewing tunnels through which the transparencies held therein may be viewed, the said viewing tunnels being spaced apart the average interpupillary distance and the viewer being designed to be held to the eyes and directed toward a source of light; comprising a housing including an upper compartment and a lower compartment, said upper compartment having an open side, the edges of which are shaped to conform to the front surface of the stereoscopic viewer around the front ends of said viewing tunnels whereby said upper compartment when mounted on said viewer forms therewith a dark chamber extending across the front of the viewer, said lower compartment extending below the viewer to provide a handle therefor, a bulb mounted centrally of said upper compartment for illuminating the interior thereof when energized, the interior of the vertical surfaces of said upper compartment comprising reflecting surfaces equidistantly arranged from said bulb and the forward ends of said viewing tunnels whereby said transparencies are equally illuminated when the bulb is energized, and means for connecting said bulb to a source of current including a pair of terminals extending into said lower compartment, said terminals comprising resilient arms extending through the bottom wall of said upper compartment and including hook tips adapted to engage the ends of conductor wires and clamp the same against said bottom wall, and said lower compartment having an opening thereinto through which a pair of conductor wires may be introduced for removable association with said terminals.

GORDON N. SMITH.

REFERENCES CITED

The following references are of record in the file of this patent:

UNITED STATES PATENTS

| Number | Name | Date |
|---|---|---|
| 1,808,176 | Pieper et al. | June 2, 1931 |
| 2,336,288 | Peterson | Dec. 7, 1943 |
| 2,349,013 | Sparling | May 16, 1944 |
| 2,478,556 | Avers et al. | Aug. 9, 1949 |
| 2,495,047 | Afton et al. | Jan. 17, 1950 |